United States Patent
Ray et al.

(10) Patent No.: US 10,051,451 B1
(45) Date of Patent: Aug. 14, 2018

(54) LOCATION DETERMINATION OF A MOBILE DEVICE BASED ON VARIOUS PARAMETERS

(71) Applicant: West Corporation, Omaha, NE (US)

(72) Inventors: Amar Nath Ray, Shawnee, KS (US); William J. Eich, Wheaton, IL (US); Gilbert Geiman, Sleepy Hollow, IL (US)

(73) Assignee: West Corporation, Omaha, NE (US)

(*) Notice: Subject to any disclaimer, the term of this patent is extended or adjusted under 35 U.S.C. 154(b) by 0 days.

(21) Appl. No.: 15/227,690

(22) Filed: Aug. 3, 2016

(51) Int. Cl.
*H04M 11/04* (2006.01)
*H04W 4/90* (2018.01)
*H04W 4/22* (2009.01)
*H04W 4/02* (2018.01)

(52) U.S. Cl.
CPC ........... *H04W 4/90* (2018.02); *H04W 4/02* (2013.01); *H04W 4/22* (2013.01)

(58) Field of Classification Search
None
See application file for complete search history.

(56) References Cited

U.S. PATENT DOCUMENTS

| | | | | |
|---|---|---|---|---|
| 8,606,293 B2* | 12/2013 | Kim | .................. | G06Q 30/0261 455/418 |
| 2012/0083285 A1* | 4/2012 | Shatsky | .................. | G01S 19/48 455/456.1 |
| 2014/0249771 A1* | 9/2014 | Yang | .................... | G01S 5/0252 702/150 |
| 2015/0296342 A1* | 10/2015 | Boukallel | ............ | G01C 21/206 455/456.1 |
| 2015/0362315 A1* | 12/2015 | Abdi | .................... | G01C 21/206 702/150 |
| 2016/0183053 A1* | 6/2016 | Bao | ........................ | H04W 4/023 455/456.1 |

* cited by examiner

Primary Examiner — Shantell L Heiber
(74) Attorney, Agent, or Firm — Raffi Gostanian

(57) ABSTRACT

Locating a mobile device in the event of an emergency may be based on common location techniques, such as GPS and geolocation. Additional location techniques may be performed in a sample method of operation which may include determining location information and environmental factor information at a mobile device, recording the location information and the environmental factor information, calculating deviations for the location information and the environmental factor information based on pre-stored location information and pre-stored environmental information, and calculating a confidence factor based on the calculated deviations, determining the mobile device location based on the confidence factor.

17 Claims, 14 Drawing Sheets

300

| Parameter | Allowed deviation in (%) to match the prerecorded DB value | Weightage Value (WV) (0.1 to 1.0) From the prerecorded table | Parameter Importance (PI) factor in that location (0.1 to 1.0) from the table | Modified weightage factor(MWP)= WV x PI |
|---|---|---|---|---|
| Background noise | 5 | 0.7 | 0.8 | 0.56 |
| Interference | 7 | 0.8 | 0.5 | 0.4 |
| | | | | |
| | | | | |

| Parameter | Matched factor in % of the Measured value (MV) of the parameter in comparison of the recorded value | Modified weightage Factor(MWP) (0.1 to 0.9) from the table | Weighted value = MVx MWP In % | Average weighted value (AWV) in % | AWV after taking into account the # of matched parameters (Modified AWV or MAWV)in % = AWV +(#MP x Allowed % value) | Confidence factor (CF) MAWV>75%-High MAWV>60%-Med MAWV>50%-Low |
|---|---|---|---|---|---|---|
| Background noise | 80 | 0.7 | 56 | 64 | 64 +{(5 + 7)/2} = 70 | Medium |
| Interference | 90 | 0.8 | 72 | | | |
| | | | | | | |
| | | | | | | |
| | | | | | | |

| Parameter | Number of Available sub-parameter to be measured | Total # of sub-parameters Recorded in the database | Number of sub-parameter matched with the prerecorded value | % of the number of parameters matched (NPM) of the total number of parameters as recorded in the DB for that location | % of the parameters value matched (PVM) of the pre-recorded parameters values measured in that location | Parameter Importance (PI) factor = ((NPM%) + (PVM%))/2 X .01 |
|---|---|---|---|---|---|---|
| Background noise | 4 (e.g. amplitude, frequency, Linearity, etc.) | 5 | 4 (e.g. amplitude, frequency, Linearity, etc.) | 80 (means 4 matches out 5 pre-recorded parameters in the data base) | 100 on the average | ((80 + 100) / 2) X .01 = 0.9 |
| Interference | 4 (e.g. Radiated RF Interference, Conducted RF Interference, Electromagnetic Interference, Electrical interference etc.) | 6 | 4 | 66 (means 4 matches out 6 pre-recorded parameters in the data base) | 60 on the average | ((66 + 60) / 2) X .01 = 0.6 |
|  |  |  |  |  |  |  |
|  |  |  |  |  |  |  |

| Environmental Parameter | Sub-parameters | Allowed deviation per sub-parameter in (%) | Average deviation per parameter in (%) |
|---|---|---|---|
| Background noise level | Amplitude<br>Frequency<br>Linearity<br>Frequency band width span<br>Etc. | 6<br>4<br>7<br>3<br>.... | 20/4=5 |
| Proximity | Ceiling height<br>Distance of the UE from side walls<br>Calculated distance between UE devices<br>Etc. | ....  | ...... |

LOCATION DETERMINATION OF A MOBILE DEVICE BASED ON VARIOUS PARAMETERS

TECHNICAL FIELD

This invention relates to locating a mobile device and more particularly to utilizing various different parameters in order to identify a mobile device location at a particular time.

BACKGROUND

Conventional emergency and other location determination processes includes dispatching emergency help to a 9-1-1 wireless communication device or caller. In those situations, location information from the mobile device calling 9-1-1 is identified from global positioning satellite information (GPS), cellular and data power signals received at local base stations, etc. The connected emergency network may attempt to locate the mobile device and in turn the user through different procedures using location and GPS information. However, GPS signal strength decreases rapidly inside any building complex and can quickly become inefficient/obsolete when providing assistance to the determination of a mobile device location inside a building or other covered structure. For example, emergency help may be delayed because the accurate location of the mobile device cannot be determined.

SUMMARY

One exemplary embodiment of the present invention includes a method that includes at least one of receiving a call for assistance from a mobile device, retrieving location information associated with a mobile communication signal associated with the mobile device, retrieving at least one environmental factor associated with an estimated location of the mobile device, and determining the mobile device location based on the mobile communication signal and the at least one environmental factor.

Another exemplary embodiment includes an apparatus that includes a receiver configured to receive a call for assistance from a mobile device, and a processor configured to retrieve location information associated with a mobile communication signal associated with the mobile device, retrieve at least one environmental factor associated with an estimated location of the mobile device, and determine the mobile device location based on the mobile communication signal and the at least one environmental factor.

Still another exemplary embodiment includes a non-transitory computer readable storage medium configured to store instructions that when executed causes a processor to perform at least one of receiving a call for assistance from a mobile device, retrieving location information associated with a mobile communication signal associated with the mobile device, retrieving at least one environmental factor associated with an estimated location of the mobile device, and determining the mobile device location based on the mobile communication signal and the at least one environmental factor.

Still yet another exemplary embodiment includes a method that includes at least one of determining location information and environmental factor information at a mobile device, recording the location information and the environmental factor information, calculating deviations for the location information and the environmental factor information based on pre-stored location information and pre-stored environmental information, and calculating a confidence factor based on the calculated deviations, determining the mobile device location based on the confidence factor.

Yet still a further exemplary embodiment includes an apparatus that includes a memory configured to store location information, and a processor configured to determine the location information and environmental factor information, record the location information and the environmental factor information, calculate deviations for the location information and the environmental factor information based on pre-stored location information and pre-stored environmental information, calculate a confidence factor based on the calculated deviations, and determine a mobile device location based on the confidence factor.

Yet another exemplary embodiment includes a non-transitory computer readable storage medium configured to store instructions that when executed causes a processor to perform determining location information and environmental factor information at a mobile device, recording the location information and the environmental factor information, calculating deviations for the location information and the environmental factor information based on pre-stored location information and pre-stored environmental information, calculating a confidence factor based on the calculated deviations, and determining the mobile device location based on the confidence factor.

BRIEF DESCRIPTION OF THE DRAWINGS

FIG. 3A illustrates an example table of mobile device environmental factor calculations according to an exemplary embodiment.

FIG. 3B illustrates another example table of mobile device environmental factor calculations according to an exemplary embodiment.

FIG. 3C illustrates yet another example table of mobile device environmental factor calculations according to an exemplary embodiment.

DETAILED DESCRIPTION

Figure 1:
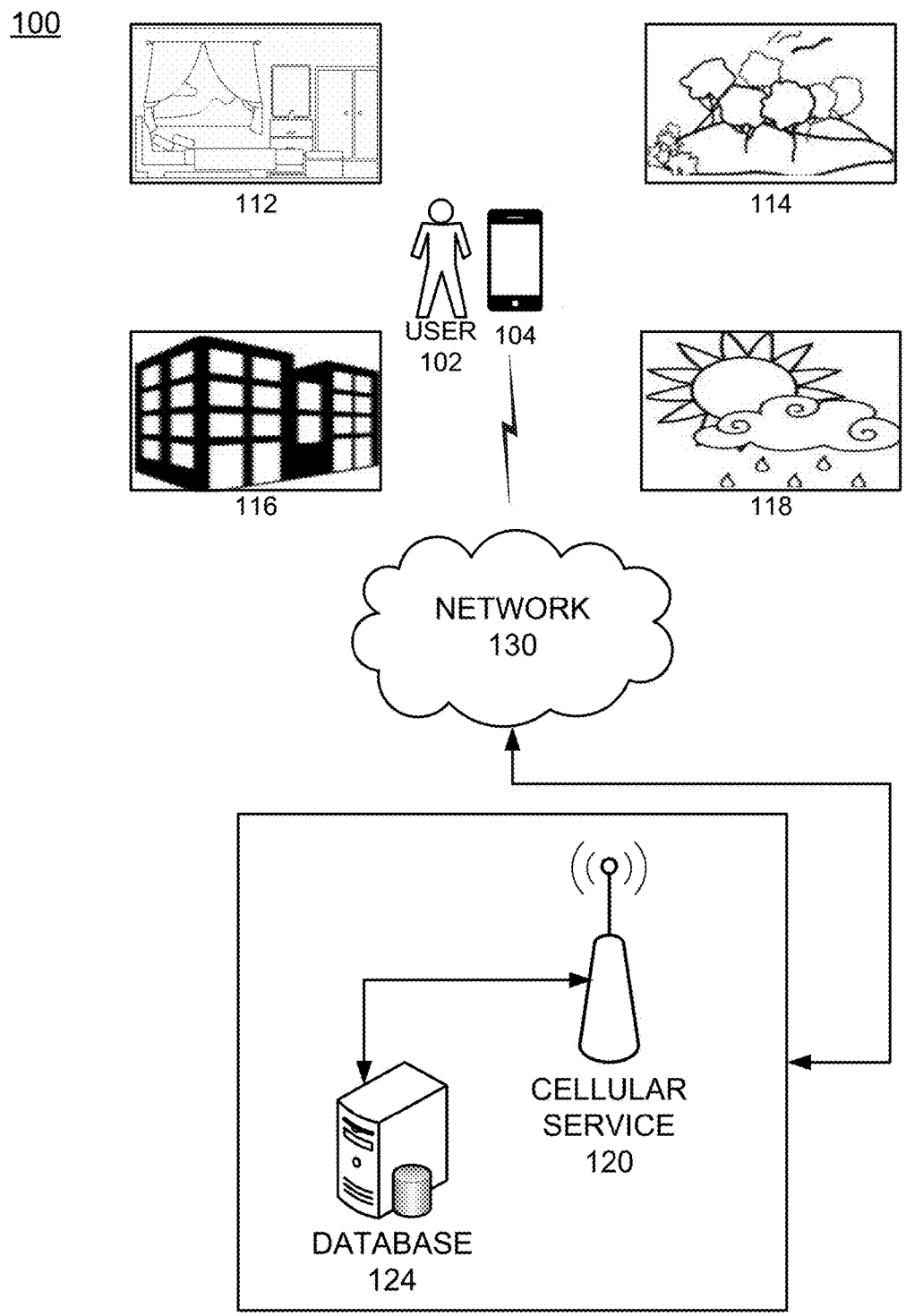
FIG. 1 illustrates an example visualization of the environmental conditions encountered by a mobile device user attempting to utilize location services according to an exemplary embodiment.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "exemplary embodiments", "some embodiments", or other similar language, throughout this specification refers to the fact that a particular feature, structure, or characteristic described in connection with the embodiment may be included in at least one embodiment. Thus, appearances of the phrases "exemplary embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" is used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Exemplary embodiments describe a device, system, method and/or computer program product configured to identify a location, record environmental parameters and wireless network communication parameters and compare the parameters against a predefined baseline of information stored in a database. Also, exemplary embodiments provide procedures for identifying the location of an advanced wireless user (user endpoint) device, e.g., smartphone, based on a combination of environmental and wireless communication parameter.

One example method of operation includes measuring any available environmental parameters within the environment of the mobile device, such as but not limited to background noise, temperature, luminosity (sun and/or artificial light sources), ceiling height, acoustic material analysis, weather conditions (e.g., barometric pressure, allergens, precipitation, temperature, wind speed, humidity, UV light measurements, etc.), altitude, etc. to assist in calculations to determine the mobile device location. A mobile device, such as a mobile device has access to various applications which can readily provide this information via a third party based on the mobile device location, or, mobile devices have many sensors which can offer the information internally without the need for a third party reference.

A raw data verification process, recording process, database upload process, system education process as well as determination of the confidence factor are also components of the overall procedure for identifying an accurate estimate of the mobile device location. Additional operations include recording the mobile device and wireless network communication parameters for a location estimate, e.g., signal strength, signal-to-noise ratio (SNR), interference, linearity, etc. The raw data can be verified and uploaded to a database after evaluation.

Environmental parameters differ from one location to the next location. For example, all mechanical systems generate noise. However, sounds generated by a mechanical system is unique and always differs from another when analyzed under a certain degree of precision. Mechanical equipment, such as a furnace, freezer, dishwasher, washer/dryer etc., generate noise that differs from one another. Even the same devices make different sounds at different locations depending on the size of the room and other factors. It may also be possible to detect the location of a smartphone based on the background noise alone or in combination with other factors.

One example procedure includes identifying, measuring, analyzing and recording various parameters to a database in the user operated mobile device or in a central system. For instance, mobile device environmental factors includes background noise, weather factors (i.e., temperature), luminosity, ceiling height, altitude, proximity, humidity, etc. Also, radio network access platform availability includes parameters related to one or more of VoLTE, CDMA, WiFi, HSPA, roaming, mobile device wireless communication performance, signal strength, signal to noise ratio, interference, linearity, QoS, etc.

Another exemplary embodiment includes a procedure to educate a database with real-time network and environmental parameters. This database education process follows certain operations including but not limited to recording all the parameters following the procedures as provided below, manually/automatically recording the location through user interaction, upon being in a new location or in a challenging or unavailable GPS environment, the mobile device will identify such information and will query the user audibly or through a screen display to provide the partial or complete description of the location, (e.g., machine room, basement cafeteria, basement storage, etc.). Additionally, the mobile device may automatically take pictures of the area which are uploaded and automatically analyzed for an environment designation regarding the whereabouts of the image(s). For automated recording actions, the application will measure all the parameters for a certain location and then will record the calculated location value based on the last available GPS information and by using a compass and/or accelerometer measurements techniques. The mobile device or the central system, through the mobile device, collects all the parameters for a specific location and then verifies the database to determine whether that location information has already been recorded.

The mobile device or the central system through the mobile device will identify the new location in a challenging GPS environment and will record the location using a predefined process as provided. For example, the application may check some of the environmental and wireless network connection parameters and will check a database to identify a new location, record the new location with all the parameter values and a calculated location based on the compass, accelerometer and/or the last available GPS location and/or the cellular signal strength with respect to one or more communication towers nearby and in communication with the user. Also, a new location may be identified with reference to a predefined location (e.g., define a laundry room with reference to the predefined location of the storage room using a compass and accelerometer technique).

The application may than continue gathering and recording data until readings from successive events remain constant (i.e., a recorded pattern repeats itself to identify a steady state value). A process algorithm may be used to identify the completion of the education procedure. Upon completion of the education process, the application will measure all parameters and determine the location of a user through a comparison process. The determination of the location includes an appropriate selection of the weighting factors based on a specific parameter exactly matching a prerecorded value which will receive a greater weighted value, e.g., exact match of the background noise or interference level/pattern. Also, a parameter with fluctuating values will receive a lower weighted value, e.g., luminosity or SNR values which are changing continuously. Based on the environmental factor situation, and wireless connection quality, the application permits deviations of the parameters to select the weightage value to estimate the appropriate confidence factor. One device does not need to take readings for every inside location. The central system will collect the parameter values for all the possible inside locations through different mobile devices/users and will share them with any mobile devices when required.

The process of comparison includes the possibilities of one or more parameters being the same within the allowed deviation limits for multiple locations. A given number of parameters must be unique within some deviations to distinguish that a new location has been identified. Also, different users will measure these parameters in different ways. However, the permitted deviation of the parameter value will resolve that issue. Comparison between reference and captured data and real time environmental factors can introduce errors and impair the location determination process. However, if the environmental impacts can be assessed with appropriate deviation, updates and cross-references then the errors and unlikely values can be factored-out with finite accuracy. This application also establishes the limits on deviation for the proper estimation of the weighting factors associated with different parameters to calculate a confidence factor with sufficient accuracy before determining a location and sending it to the emergency service provider during a 9-1-1 call.

FIG. 1 illustrates an example visualization of the environmental conditions encountered by a mobile device user attempting to utilize location services according to an exemplary embodiment. Referring to FIG. 1, the mobile device environment 100 includes a mobile device 104 operated by a user 102. The device 104 is in WIFI/4G/LTE communication with a mobile service 120. The information collected by the user is stored in a database 124 for location reference services. The database 124 may be a local database or a cloud database. The environments includes any or more of a confined space room 112 with acoustic signatures depending on the dimensions of the floors, walls and ceilings, an outdoor area 114 with a weather signature, noise signature, elevation, etc., a weather rich environment 118 with a degree of sunshine, precipitation, humidity, wind, etc., and a building 116 with certain room and space characteristics. Any of the environments presented to the user 104 may be identified via multiple sensors, multiple data feeds from multiple third party information sources which identify a user location and pair the location's characteristics with the identified location. Also, multiple instances of environmental conditions are identified and are logged as the conditions and location change. For example, a rainy weather condition followed by a no rain condition and rapid acoustic silence would indicate the user has left the rainy weather and entered a building without the assistance of a specific location assistance measurement. As information is collected from the user location or the user itself, the information is uploaded through the network 130 to a cellular service tower 120 which is then uploaded to a database.

Figure 2:
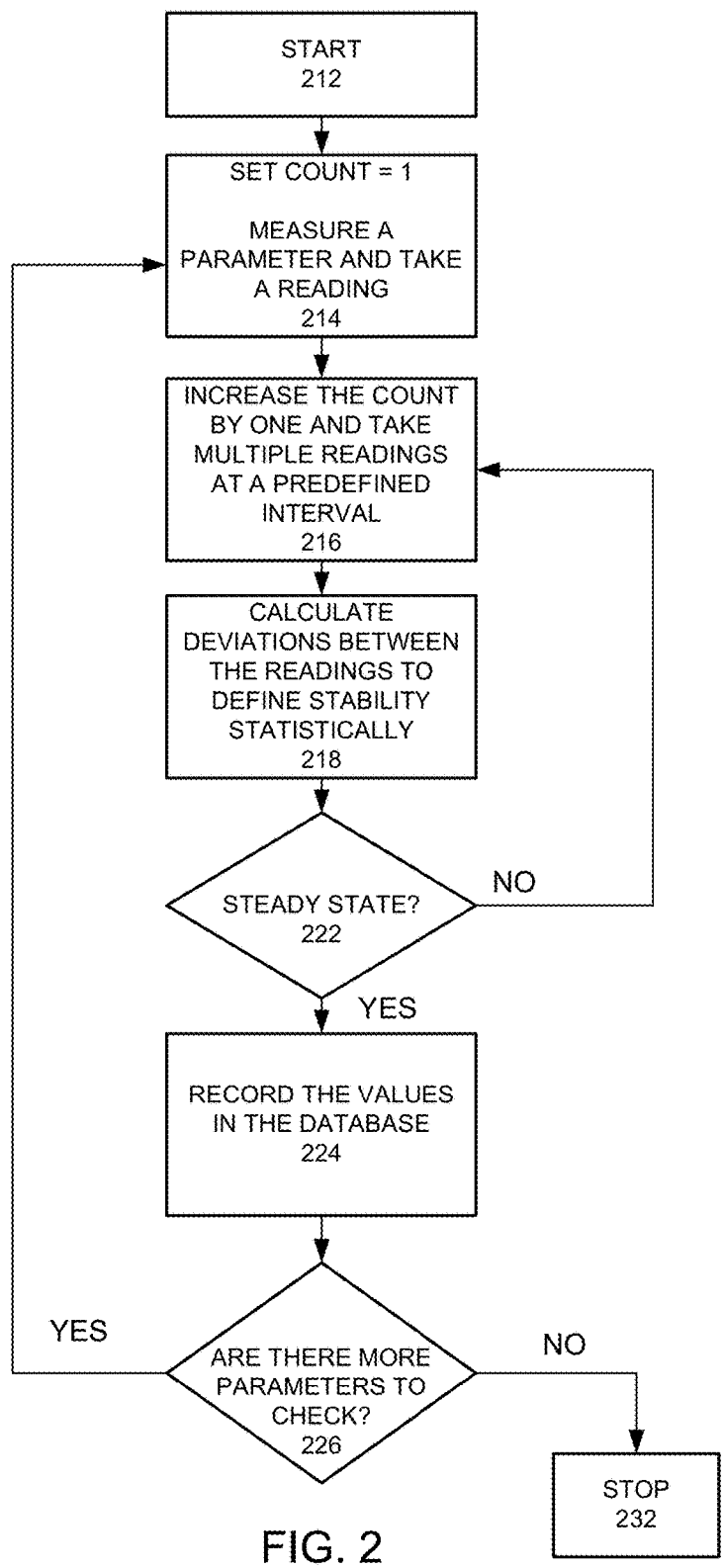
FIG. 2 illustrates a flow diagram of an example procedure for calculating user location parameters according to an exemplary embodiment.

FIG. 2 illustrates a flow diagram of an example procedure for calculating user location parameters according to an exemplary embodiment. Referring to FIG. 2, the parameter recording process is based on recording the parameters in the user database on a temporary basis to be uploaded at a later time. However, upon initiation of an emergency call, the user will deliver all the measured data immediately to ensure the prompt location determination of the user can be calculated. Measuring deviation to find the steady state is constrained by the count so it will not continue onward indefinitely. The parameters in the central system database can be recorded directly through the mobile device, and the parameters initiated by the building/complex owner or service authority/provider can also be recorded. The owner of the central system (CS) is expected to be predefined and the location of the CS is also used for the communication of data.

Referring to FIG. 2, the flow diagram 200 includes a start operation 212 and a count is initialized at a value of one 214. A parameter is measured and a reading is taken as well to identify the type of parameter which has been received. Next, the count is increased by one and multiple readings are taken at predefined intervals 216. The deviations between the readings are calculated to define a stabile statistic about the user environment 218. A steady state determination is then performed 222 and if the steady state criteria is satisfied then the values are recorded in the database 224. A determination is then made as to whether there are additional parameters to identify and check 226 if not the procedure stops 232 otherwise the cycle continues at 214.

According to one example, the deviations are calculated by measuring the difference between the current reading and one or more previous readings. For example, the temperature for a specific location measured at periodic intervals are 22(count=1), 28(count=2), 29(count=3), 29.4(count=4), 29.6(count=5) and 29.1(count=6). Here the deviation is 6 between the first two readings, and the deviation between the last few readings is less than 0.5 or 0.6. Based on the permitted deviation, the system application may consider that the readings come to a steady state at the $4^{th}$ or $5^{th}$ measurement and thus the corresponding value of the parameter may be recorded in the database 124.

FIG. 3A illustrates an example table of mobile device environmental factor calculations according to an exemplary embodiment. Referring to FIG. 3A, table 300 includes the recordings of different environmental and wireless communication parameters, followed by the estimation of deviation for each parameter. In table 300, sample parameters are for discussion purpose only and may vary depending on the various different parameters received to represent the location and environment of a (UE). Actual parameters and attribute values are defined based on the carrier requirements. The parameters include the allowed deviation 312, the weightage value (WV) 314 ranging from 0.1 to 1.0, the parameter importance PI factor 316 in a particular location ranging from 0.1 to 1.0 and a modified weightage factor MWP 318 which is WV×PI.

Regarding the weightage factor in the pre-recorded database, at the time of measuring the deviation of a parameter, if the deviation does not change after multiple readings then that parameter will receive a higher weightage factor. For example, if the background noise was measured five times and each time it comes out to be the same or with very little measured deviation (i.e., 25, 25, 25.1, 25.2, 25) then in this case the parameter value will be recorded as '25' and the weightage value will be recorded as 0.9 or 0.8 (high weightage value). The parameter of importance factor (PI) determination process is illustrated in the FIG. 3C.

In FIG. 3B, the table 320 includes a matched factor 322 of the measured value (MV) in comparison to the recorded value. The modified weightage factor (MWP) 324 may be from 0.1 to 0.9, the weighted value 326 is shown in a percentage, the average weighted value 327 is also in a percentage, the AWV is then shown 328 as a calculation for the number of matched parameters as a modified AWV. The confidence factor 329 is also shown based on a range of results. In FIG. 3C, the parameters include a number of available sub-parameters to be measured 342, a total number of sub-parameters matched with a pre-recorded value 346, a percent of the number of parameters matched (NPM) 347 as recorded in the database for that location, and a percent of the parameters matched (PVM) and a final parameter importance factor (PI) 349.

Another example of the interference includes 6 sub-parameters already recorded in the database. Out of these 6 sub-parameters, only 4 sub-parameters may be available and are measured for a specific location. On the average, if 4 sub-parameters are matched with 60% of the recorded values in the database for that location then the PI factor calculation will result in the example illustrated in FIG. 3C. The parameter allowed deviation in (%) is used to match the pre-recorded database (DB) value weights. For example, from 0.1 to 1.0 received from the pre-recorded table. Parameter importance (PI) is a factor that has a value from 0.1 to 1.0 from the table. Modified weightage factor (MWP)=WV× PI. Background noise can then be demonstrated as 20, 0.7, 0.8, and 0.56, respectively. Also, interference can also be represented as 10, 0.8, 0.5 and 0.4, respectively.

Referring to FIG. 3B, the table 320 includes a parameter measured value (MV) of the parameter in % of the optimum value, a modified weightage factor (MWP) (0.1 to 0.9) from the table, a waited value=MV×MWP in %, an average waited value (AWV) in % Also, the AWV after taking into account the # of matched parameters (Modified AWV or MAWV) in %=AWV+(#MP×Allowed % value) and confidence factor (CF) MAWV>75%—High, MAWV>60%—Med, MAWV>50%—Low. As a result, the background noise is 80, 0.7, and 56, respectively. The AWV is 64 and 64+(2×3)=70 in the AWV after taking into account the number of matched parameters. Also, the range of the MAW is considered 'Medium'. Additionally, the interference is 90, 0.8 and 72, respectively. If the CF value goes down below an acceptable predefined level threshold then the CS will send an indication (e.g. an error message).

Referring to FIG. 3C, the parameter, number of available parameters to be measured, a total # of sub-parameters recorded in the database, a number of sub-parameter matched with the prerecorded value % of the parameters matched of the total as recorded in the DB [MP#/DB]%, a percentage of the parameters matched of the available parameters measured in the location [MP#/AMP]%, and a parameter importance (PI) factor={(MP#/DB)+(MP#/AMP)}/2×0.01, where the MP#/DB—matched parameter number per data base, MP#/AMP—matched parameter number per available measured parameters in that location. In addition, the background noise may be 4, 5, 4—(e.g. amplitude, frequency, linearity, etc.), and 80 (means 4 matches out 5 pre-recorded parameters in the database), 100 (means 4 matches out 4 available measured parameters in that location), the end result includes {(80+100)/2}× 0.01=0.9. Also, the interference is 8, 13, 8, 60 and 80 resulting in 0.7.

In the table 340, it is assumed all sub-parameters have the same weightage value. The importance of each sub-parameter may differ from another. However, from a data comparison the importance is considered to be roughly equal. The weighted values of the percentage of the parameters matched of the total as recorded in the database (column #3) and the percentage of the parameters matched of the available parameters measured in the location (column #4) are considered to be the same to determine the parameter importance functions. The following table includes some of the environmental and network communication parameters and sub-parameters. The permitted deviation per sub-parameter as well as the average deviation per parameter is also provided in the table. The deviation limits per parameter and sub-parameter will be established by the system owner (e.g., emergency network provider) as per their requirements for a specific location.

In FIG. 3B, regarding the 80% background noise, the average of the sub-parameter values is 80% matching of the same pre-measured values recorded in the database in the steady state. This means that the matching factor is 80. Where '0' represents no matching and 100 represents an exact match. The sub-parameter values are measured to get their contribution in calculating the matching factor of the parameter with the prerecorded value(s). For example, amplitude and frequency are sub-parameters of the background noise, which is a parameter.

Figure 3D:
FIG. 3D illustrates still yet another example table of mobile device environmental factor calculations according to an exemplary embodiment.
Figure 3E:
FIG. 3E illustrates still yet a further example table of mobile device environmental factor calculations according to an exemplary embodiment.

FIG. 3D illustrates still yet another example table of mobile device environmental factor calculations according to an exemplary embodiment. Referring to FIG. 3D, the table 360 includes network communication parameter, sub-parameters 362, allowed deviation per sub-parameter in (%) 364, and average deviation per parameter in (%) 366. Quality of service includes, jitter, delay, packet loss, etc., and deviation of 12, and 10 with an average deviation per parameter of 10. The network communication parameter, includes a (RAN) radio access network and a signal strength, signal to noise ratio and interference FIG. 3E illustrates still yet a further example table of mobile device environmental factor calculations according to an exemplary embodiment. Referring to FIG. 3E, the table 380 includes environmental parameter and sub-parameters 382, allowed deviation per sub-parameter in (%) 384, and average deviation per parameter in (%) 386. The variables include a background noise level having an amplitude, frequency, linearity, bandwidth, etc. having values of 10, 12, 18 and 8, respectively. Also, the average deviation is 12. The proximity includes ceiling height, distance of the user from sidewalls, calculated distance between mobile devices, etc. The weather and environment may also include altitude, humidity and temperature. Selection of the number of parameters as well as the type of parameters will be conducted by the system carrier/owner as per their requirements.

Figure 3F:
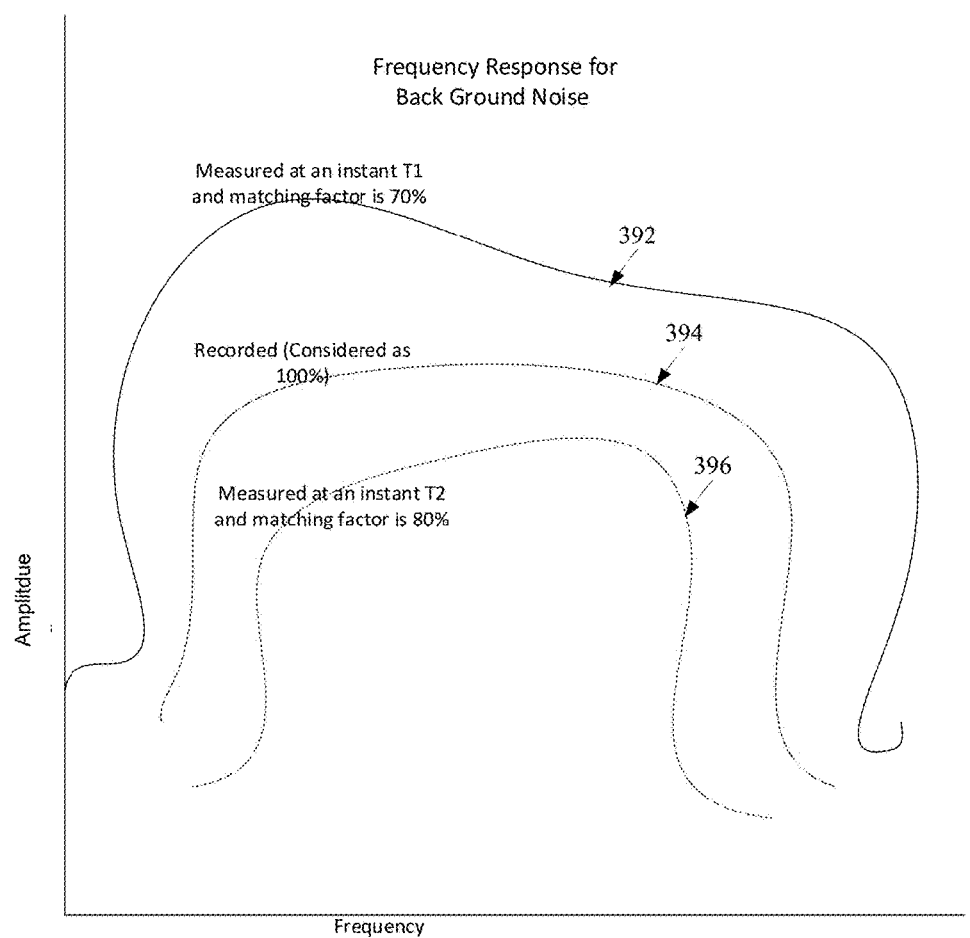
FIG. 3F illustrates a frequency response of background noise according to an exemplary embodiment.

FIG. 3F illustrates a graph 390 of the frequency response for background noise. In this example, the recorded value 394 is the baseline for comparison purposes. The two instances T1 392 and T2 396 are also shown as being above and below the ideal frequency response.

When recording samples for processing, upon being in a new location, such as a challenging GPS environment (mountains, walls, etc.), the mobile device will identify the situation and will prompt the user audibly or through screen display to provide the partial or complete description or confirm the location, e.g., machine room, basement cafeteria, basement storage etc. For automated recording, the system application will measure all the parameters for a certain location and then will record the calculated location value based on the last available GPS information and using a compass and/or accelerometer. The mobile device or the central system application through the mobile device will collect all the parameters for a specific location and then will verify with the existing database to check whether that location information has already been recorded. The mobile device or the central system, through the mobile device, will identify the new location in the challenging GPS environment and will record the location using a predefined procedure. For example, checking some of the environmental and wireless network connection parameters and then checking a database to identify a new location. Recording the new location with all the parameter values and a calculated location based on compass, accelerometer and last available GPS location, or identifying a new location with reference to a predefined location, e.g., define laundry room with reference to the predefined location of the storage room using compass and accelerometer location techniques. The application will continue gathering and recording data until readings from successive events remains constant (i.e., recorded pattern repeats itself to identify a steady state value). In one example, identifying the location automatically as a new location, the parameter value(s) will be measured at a predefined time interval. Upon reaching a steady state, such as when the deviation/delta between the readings does not change or change within the predefined limits, then the data is recorded and will consider the database education process as completed.

In the event that this location and detail identifying procedure is be performed manually, (e.g. all parameters will be measured manually in each room/location) the database recording portion of the application will record all data without using a database education process. An example of using a compass and accelerometer technique to define a new location with reference to another location is provided below. Suppose the mobile device is in a laundry room for the first time and the device measures all the parameters (e.g., room size, noises, etc.) and records the data against the laundry room location by going through the database education process. Then later another mobile device arrives at that laundry room and the phone takes the measurements again, the database application would identify the parameters to be allocated already for the laundry room location and will not go through the recording process again. However, if the user walked the mobile device for a few steps in a particular direction to a new location then the device will measure the data at that new location and the database recording application will record the new parameter data for a new location with reference to the old location, (i.e., the laundry room). For example, certain parameters may be recorded for a location which is 20 feet away towards the northeast from the laundry room using a compass and accelerometer technique included in the mobile device (phone).

Figure 4A:
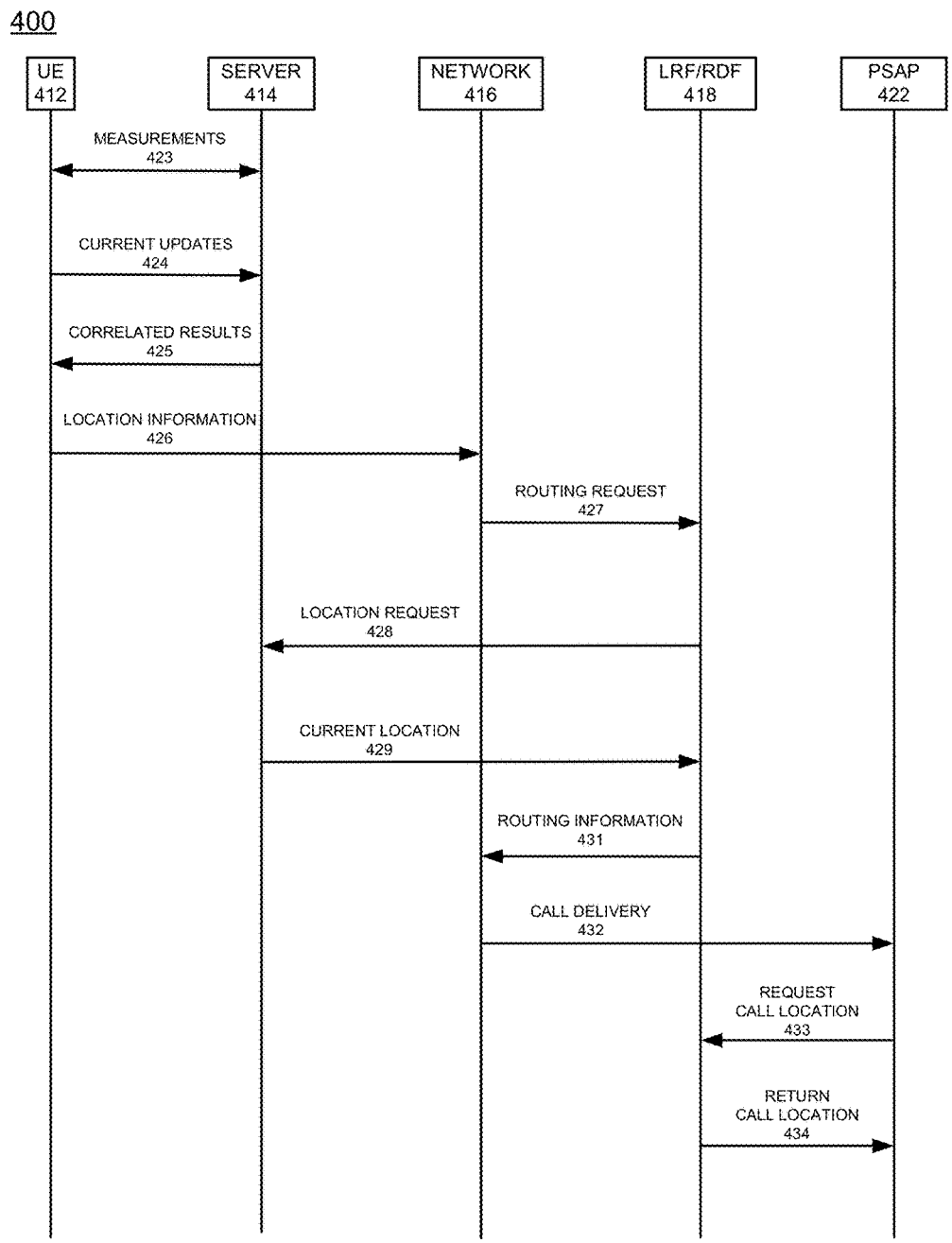
FIG. 4A illustrates a system signaling diagram of a transferring a location of a mobile device according to an exemplary embodiment.

FIG. 4A illustrates a system signaling diagram of a transferring a location of a mobile device according to an exemplary embodiment. In general, the call flow for passing the indoor location to the emergency service provider, e.g., 'PSAP' in packet-based networks are categorically described with reference to FIG. 4A. Referring to FIG. 4A, the call flow 400 includes a high level signal and message flow for transferring the location information from the CS server 414 to the PSAP 422. This diagram does not provide any call flow for updated location inquiry. Also, reference by location rather than by value will be considered appropriate in this use case.

In operation, the user 412 shares measurements taken with a server 414, the measurements 423 may be provided by a third party information source which correlates known environmental information (e.g., recent variables (weather), permanent variables (altitude)) based on a current location of the user. Other measurements may be taken by sensors included in the user locally and shared by uploads. The updated information is sent 424 as it is collected. The results 425 are provided back to the user 412 for location correlation. Once the call is sent, the location information is then sent contemporaneously with the call for assistance 426. A location value or SIP invite may also be sent to the network 416. A network routing request 427 is then sent to the location retrieval function and routing determination function LRF/RDF device 418. The location request 428 is sent back to the server 414. A current location 429 is sent to the LRF/RDF 418. The RDF 418 returns routing digits 431 and caches the current location and the network delivers the call 432 to the PSAP 422. The PSAP requests the initial caller location 433 and the LRF then returns the cached indoor location 434.

Figure 4B:
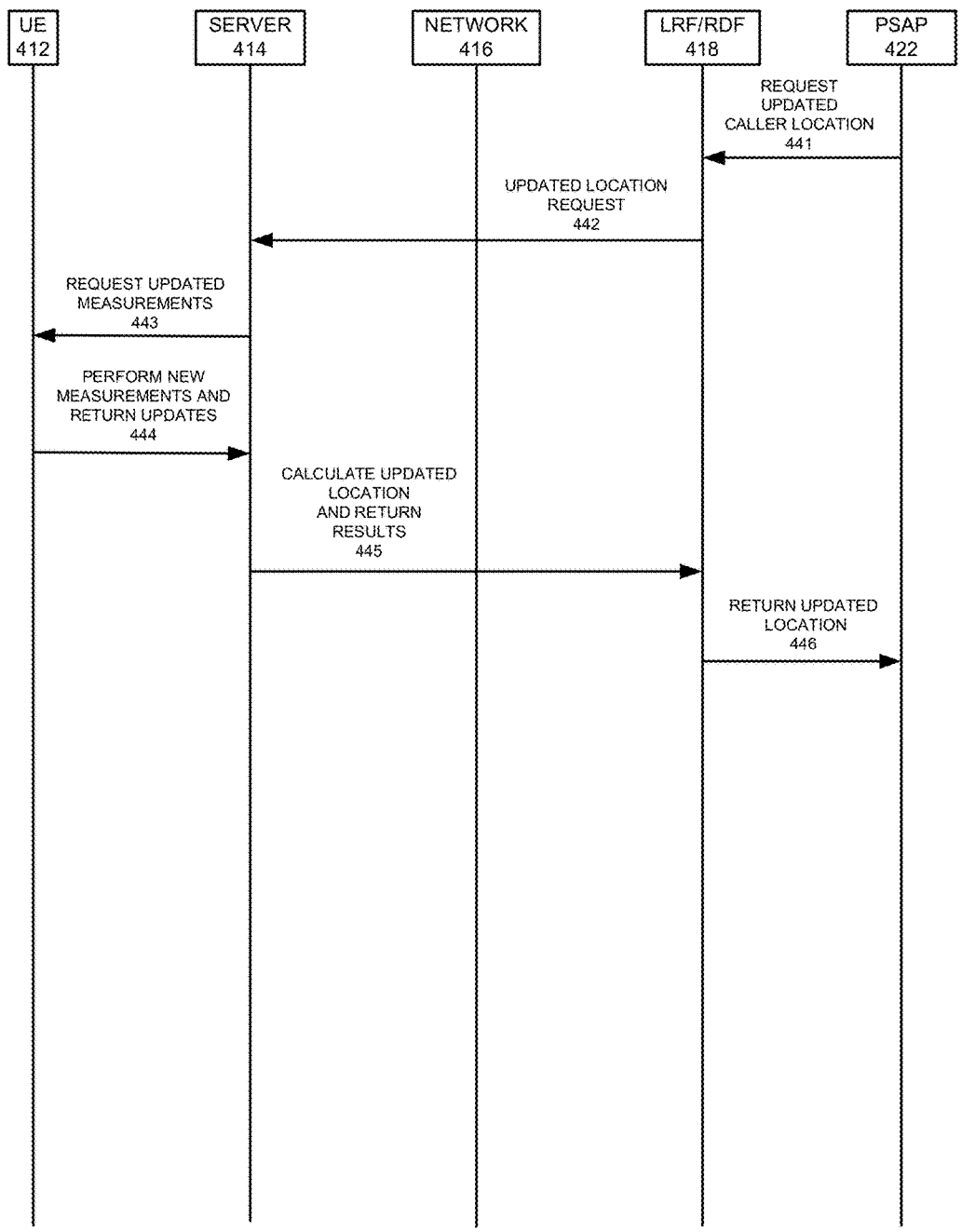
FIG. 4B illustrates another system signaling diagram of sharing updated location queries of a mobile device according to an exemplary embodiment.

FIG. 4B illustrates another system signaling diagram of sharing updated location queries of a mobile device according to an exemplary embodiment. The diagram illustrates the call flow for updated location queries and responses in packet-based network. The example includes call flow for passing the indoor location to the emergency service provider, e.g., PSAP in circuit-switched networks.

The example flow 440 includes the PSAP 422 requesting user call location information 441. The LRF/RDF 418 may then submit an updated location request 442 to the server 414. The user 412 may receive a request for updated measurements 443 from the server 414. The request may initiate new measurement samples being retrieved and returned as updates 444 to the server 414. The updated location information can be updated and returned accordingly 445 to the LRF/RDF 418 which forwards 446 the information to the PSAP 422.

Figure 4C:
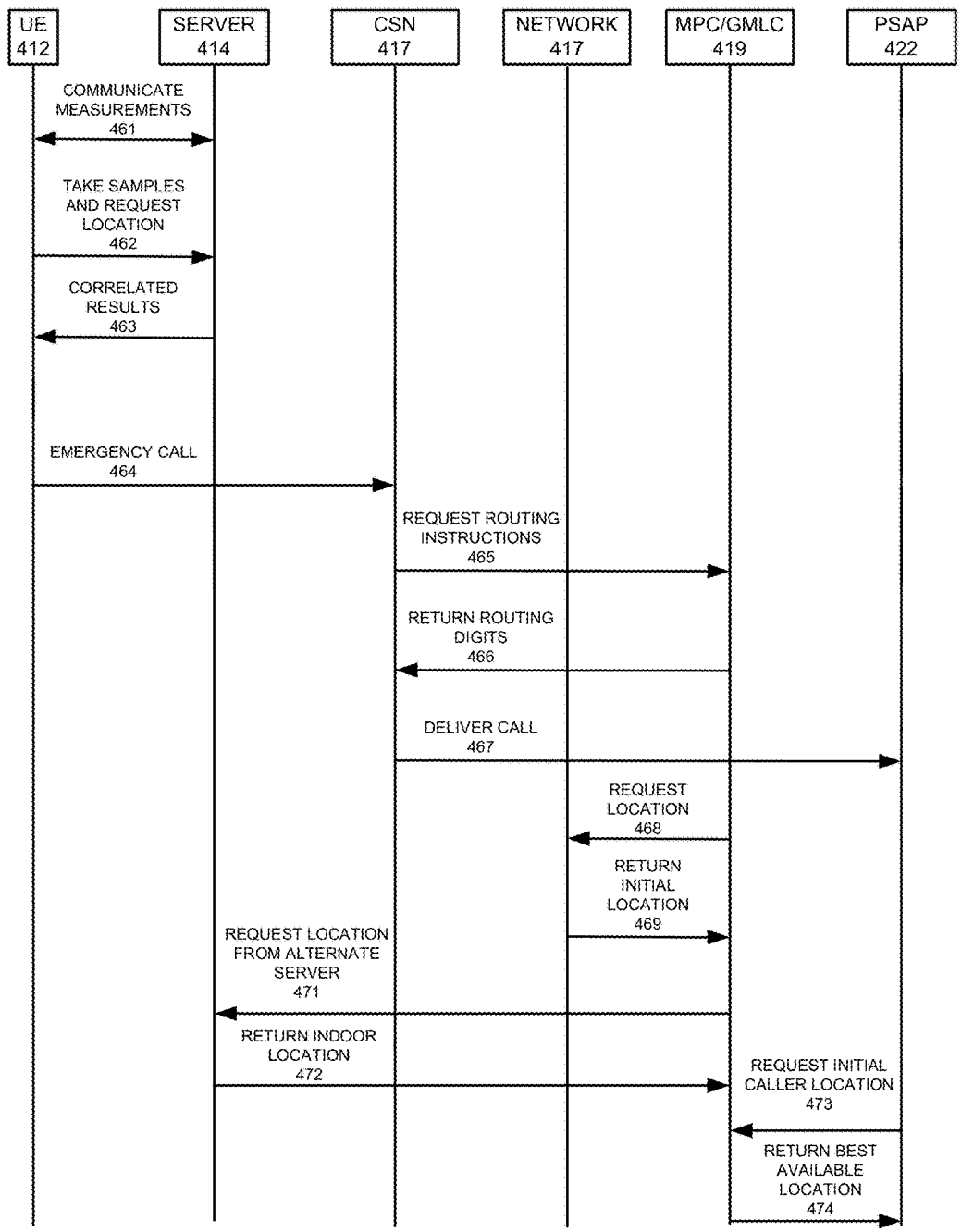
FIG. 4C illustrates another system signaling diagram of a call in a circuit switch network according to an exemplary embodiment.

FIG. 4C illustrates another system signaling diagram of a call in a circuit switch network according to an exemplary embodiment. The above diagram shows the general call flow in circuit switch network. Referring to FIG. 4C, the flow 460 includes the user 412 sharing measurements 461 with the server 414 and taking new samples and requesting location information 462 when an emergency call is performed. The results are correlated to that location and returned 463. The call is then forwarded to the circuit switched network 417. The network requests routing instructions 465 and the MPC/GMLC returns digits 466. The call is then delivered 467 to the PSAP 422 and the MPC requests location information 468 which is returned as an initial location 469. Also, the MPC may request a location from an alternate location server 471 which provides the information as requested 472. The PSAP 422 requests the initial caller location 473 and the MPC returns the best available location from either network server 417 or the alternate server 414.

Figure 4D:
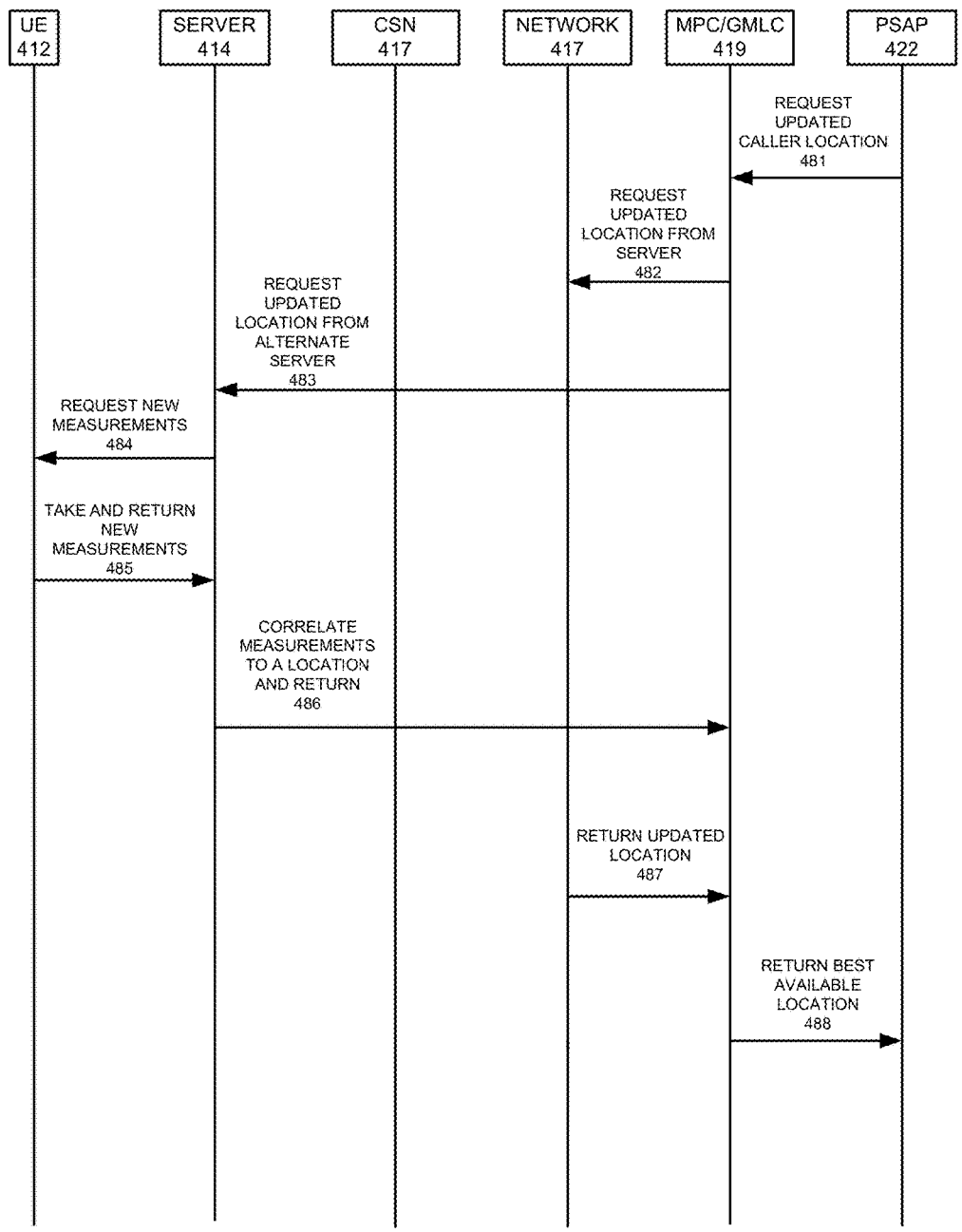
FIG. 4D illustrates another system signaling diagram of sharing updated location queries of a mobile device in a circuit switched network according to an exemplary embodiment.

FIG. 4D illustrates another system signaling diagram of sharing updated location queries of a mobile device in a circuit switched network according to an exemplary embodiment. The above diagram shows the call flow for updated location queries and responses in circuit switch network.

Referring to FIG. 4D, the system diagram 480 includes a request being sent to the MPC from the PSAP for the updated caller location information. The MPC then requests the updated location from the server 482 which forwards a request 483 to the server for an alternate server. The server 414 may then request new measurements 484 which are returned as new measurements 485. The server correlates the measurements to a location 486 and returns the information to the MPC 419. The location is then updated 487 and the best available location is sent to the PSAP 488 whether it be from the network server 417 or the alternate server 414.

The above diagrams of FIGS. 4A through 4D are intended to show the generic call flow in the circuit switch domain. However, the appropriate format/protocol for some of the call flow messages may differ from network to network.

Figure 5:
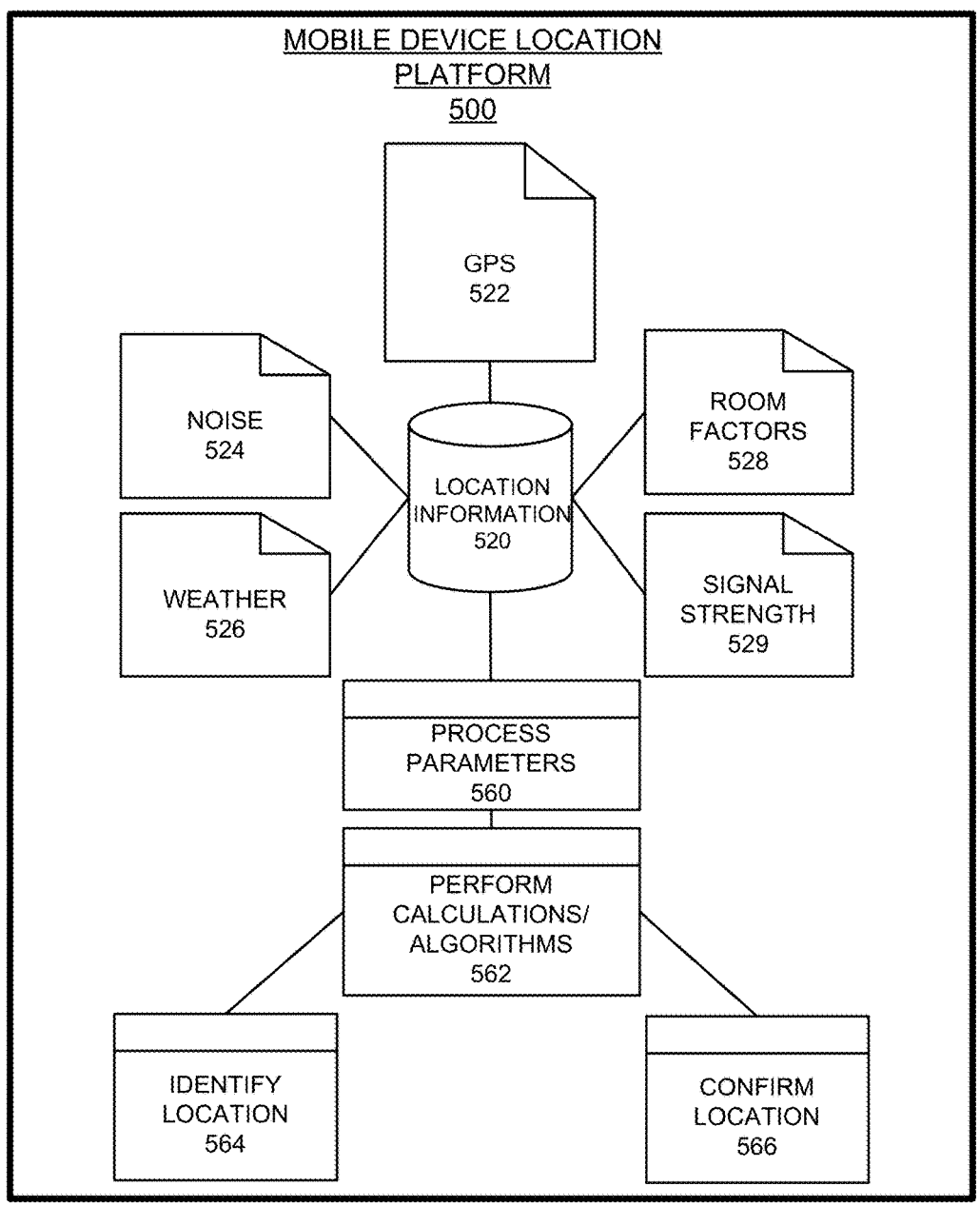
FIG. 5 illustrates a mobile device location software module platform according to exemplary embodiments.

FIG. 5 illustrates a mobile device location software module platform according to exemplary embodiments. In FIG. 5, the platform 500 includes a database 520 receiving information about a user location including but not limited to GPS information 522, noise at a location 524, weather at a location 526, room factors 528 if the location is enclosed, mobile device signal strength of signals 529. The information is processed in a first process 560 to identify validity of the information and weight the information based on importance factors. The calculations and algorithms 562 are used to arrive at a certainty level of the user location. The operations to identify the location 564 and confirm that location 566 may be conducted as best guess measurements provided to emergency services.

One exemplary embodiment includes a method that includes receiving a call for assistance from a mobile device, retrieving location information associated with a mobile communication signal associated with the mobile device, retrieving at least one environmental factor associated with an estimated location of the mobile device, and determining the mobile device location based on the mobile communication signal and the at least one environmental factor. The location information may be based on cellular signal data (i.e., triangulation, GPS, power estimation, etc.), the environmental factor may dictate a noise or other sensed condition and location which may be referenced to provide additional environmental conditions.

Additional operations includes determining the mobile device has a recently logged geolocation status, and determining the mobile device location is an outdoor environmental area responsive to identifying the recently logged geolocation status. The method may also include retrieving the at least one environmental factor as a weather condition, a luminosity level and/or a background noise. The weather condition can include at least one of humidity, temperature, precipitation, wind speed, allergen presence, and/or barometric pressure. Additional measures includes determining the mobile device location is an indoor environmental area.

The environmental factor includes at least one static environmental factor such as a location, an elevation, a common noise pattern, wall sizes and room dimensions, etc., and at least one dynamic environmental factor, such as weather conditions and unexpected noise patterns and current luminosity levels. When measuring and comparing, an environmental factor baseline may be retrieved from a database and used to compare the environmental factor to the environmental factor baseline to determine a certainty level or percentage of certainty and then a location of the mobile device can be determined when the comparing yields a certainly level above a predefined certainty level threshold.

According to another exemplary embodiment, a method includes determining location information and environmental factor information at a mobile device, recording the location information and the environmental factor information, calculating deviations for the location information and the environmental factor information based on pre-stored location information and pre-stored environmental information, and calculating a confidence factor based on the calculated deviations, and determining the mobile device location based on the confidence factor. In this example, the location information may be weighed with a modified weightage factor value between 0.1 and 1.0. The environmental location information may also be weighed with a modified weightage factor value between 0.1 and 1.0. The environmental factor information includes at least one of background noise, temperature, luminosity, distance from walls, ceiling height of an indoor structure, altitude, humidity, wind speed, precipitation levels, humidity, and allergen levels. Also, the location information includes a GPS location, a triangulated location, and a power level of a signal received from the mobile device. The operations may also include determining whether the mobile device location is in an indoor environmental area or an outdoor environmental area. Additionally, retrieving an environmental factor baseline from a database, comparing the environmental factors to the environmental factor baseline to determine a certainty level, and determining a location of the mobile device when the comparing yields a certainly level above a predefined certainty level threshold may be used to identify the location of the mobile device.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent or be integrated in any of the above-described components, etc.

Figure 6:
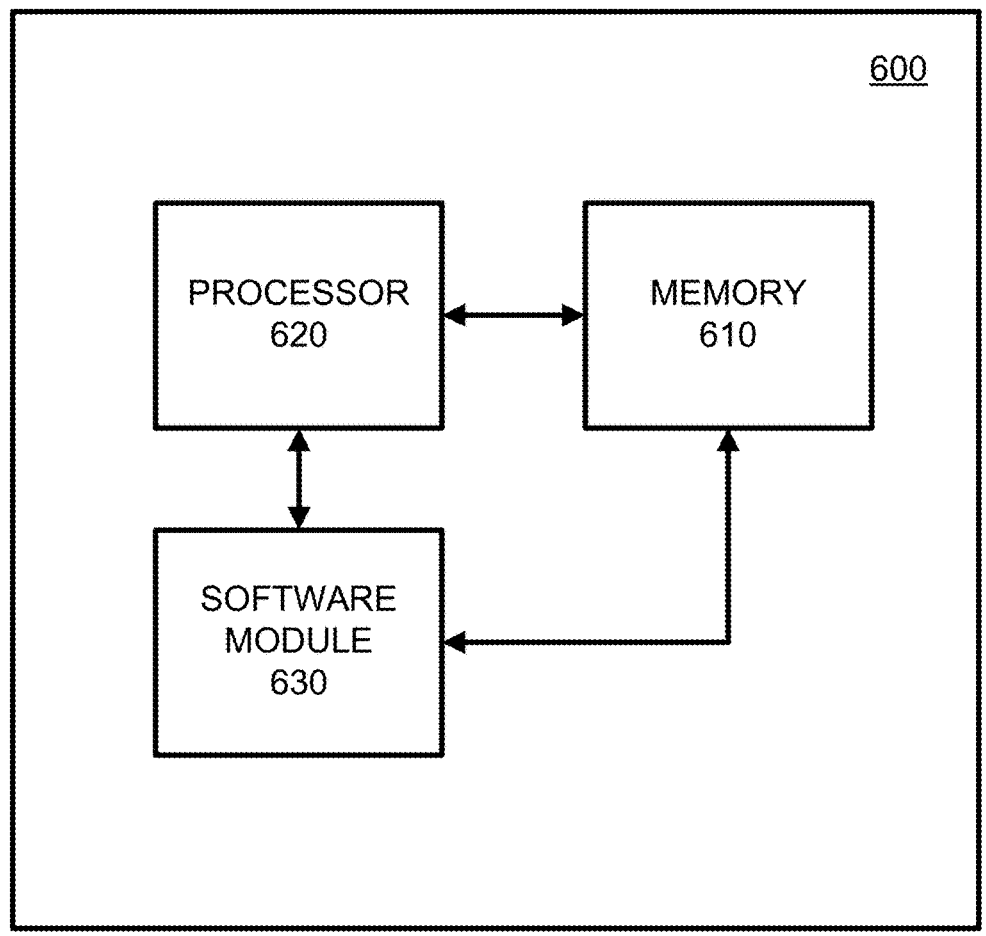
FIG. 6 illustrates a computer readable medium and non-transitory computer processing platform for performing procedures according to exemplary embodiments of the present application.

As illustrated in FIG. 6, a memory 610 and a processor 620 may be discrete components of a network entity 600 that are used to execute an application or set of operations as described herein. The application may be coded in software in a computer language understood by the processor 620, and stored in a computer readable medium, such as, a memory 610. The computer readable medium may be a non-transitory computer readable medium that includes tangible hardware components, such as memory, that can store software. Furthermore, a software module 630 may be another discrete entity that is part of the network entity 600, and which contains software instructions that may be executed by the processor 620 to effectuate one or more of the functions described herein. In addition to the above noted components of the network entity 600, the network entity 600 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and includes a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    determining location information and environmental factor information at a mobile device;
    recording the location information and the environmental factor information;
    calculating deviations for the location information and the environmental factor information based on pre-stored location information and pre-stored environmental information;
    calculating a confidence factor based on the calculated deviations; and
    determining the mobile device location based on the confidence factor;
    wherein the environmental factor information comprises at least one of luminosity, distance from walls, ceiling height of an indoor structure, indoor acoustic signatures dependent upon the distance from walls and ceiling height of the indoor structure, altitude, precipitation levels, allergen levels, and outdoor acoustic signatures dependent upon the altitude and precipitation levels;
    wherein at least one of the indoor acoustic signatures and the outdoor acoustic signatures comprises an acoustic signature of at least one mechanical device or electrical device; and
    wherein the pre-stored location information and pre-stored environmental information comprises data determined to be constant after readings gathered and recorded from successive events remain constant over a predefined time interval.

2. The method of claim 1, further comprising:
    weighting the location information with a modified weightage factor value between 0.1 and 1.0.

3. The method of claim 2, further comprising:
    weighting the environmental location information with a modified weightage factor value between 0.1 and 1.0.

4. The method of claim 1, wherein the location information comprises at least one of a GPS location, a triangulated location, and a power level of a signal received from the mobile device.

5. The method of claim 1, further comprising:
determining whether the mobile device location is in an indoor environmental area or an outdoor environmental area.

6. The method of claim 1, further comprising:
retrieving an environmental factor baseline from a database;
comparing the at least one environmental factor to the environmental factor baseline to determine a certainty level; and
determining a location of the mobile device when the comparing yields a certainly level above a predefined certainty level threshold.

7. An apparatus comprising:
a memory configured to store location information; and
a processor configured to
determine the location information and environmental factor information;
record the location information and the environmental factor information;
calculate deviations for the location information and the environmental factor information based on pre-stored location information and pre-stored environmental information;
calculate a confidence factor based on the calculated deviations; and
determine a mobile device location based on the confidence factor;
wherein the environmental factor information comprises at least one of luminosity, distance from walls, ceiling height of an indoor structure, indoor acoustic signatures dependent upon the distance from walls and ceiling height of the indoor structure, altitude, wind speed, precipitation levels, and allergen levels, and outdoor acoustic signatures dependent upon the altitude and precipitation levels;
wherein at least one of the indoor acoustic signatures and the outdoor acoustic signatures comprises an acoustic signature of at least one mechanical device or electrical device; and
wherein the pre-stored location information and pre-stored environmental information comprises data determined to be constant after readings gathered and recorded from successive events remain constant over a predefined time interval.

8. The apparatus of claim 7, wherein the processor is further configured to weight the location information with a modified weightage factor value between 0.1 and 1.0.

9. The apparatus of claim 8, wherein the processor is further configured to weight the environmental location information with a modified weightage factor value between 0.1 and 1.0.

10. The apparatus of claim 7, wherein the location information comprises at least one of a GPS location, a triangulated location, and a power level of a signal received from the mobile device.

11. The apparatus of claim 7, wherein the processor is further configured to
determine whether the mobile device location is in an indoor environmental area or an outdoor environmental area.

12. The apparatus of claim 7, wherein the processor is further configured to
retrieve an environmental factor baseline from a database;
compare the at least one environmental factor to the environmental factor baseline to determine a certainty level, and
determine a location of the mobile device when the comparing yields a certainly level above a predefined certainty level threshold.

13. A non-transitory computer readable storage medium configured to store instructions that when executed causes a processor to:
determine location information and environmental factor information at a mobile device;
record the location information and the environmental factor information;
calculate deviations for the location information and the environmental factor information based on pre-stored location information and pre-stored environmental information;
calculate a confidence factor based on the calculated deviations; and
determine the mobile device location based on the confidence factor;
wherein the environmental factor information comprises at least one of luminosity, distance from walls, ceiling height of an indoor structure, indoor acoustic signatures dependent upon the distance from walls and ceiling height of the indoor structure, altitude, precipitation levels, allergen levels, and outdoor acoustic signatures dependent upon the altitude and precipitation levels;
wherein at least one of the indoor acoustic signatures and the outdoor acoustic signatures comprises an acoustic signature of at least one mechanical device or electrical device; and
wherein the pre-stored location information and pre-stored environmental information comprises data determined to be constant after readings gathered and recorded from successive events remain constant over a predefined time interval.

14. The non-transitory computer readable storage medium of claim 13, wherein the processor is further configured to:
weight the location information with a modified weightage factor value between 0.1 and 1.0.

15. The non-transitory computer readable storage medium of claim 14, wherein the processor is further configured to:
weight the environmental location information with a modified weightage factor value between 0.1 and 1.0.

16. The non-transitory computer readable storage medium of claim 13, wherein the location information comprises at least one of a GPS location, a triangulated location, and a power level of a signal received from the mobile device.

17. The non-transitory computer readable storage medium of claim 13, wherein the processor is further configured to:
determine whether the mobile device location is in an indoor environmental area or an outdoor environmental area;
retrieve an environmental factor baseline from a database;
compare the at least one environmental factor to the environmental factor baseline to determine a certainty level; and
determine a location of the mobile device when the comparing yields a certainly level above a predefined certainty level threshold.

* * * * *